United States Patent
Bishop et al.

(10) Patent No.: US 7,478,276 B2
(45) Date of Patent: Jan. 13, 2009

(54) METHOD FOR CHECKPOINTING INSTRUCTION GROUPS WITH OUT-OF-ORDER FLOATING POINT INSTRUCTIONS IN A MULTI-THREADED PROCESSOR

(75) Inventors: James Wilson Bishop, Leander, TX (US); Hung Qui Le, Austin, TX (US); Michael James Mack, Round Rock, TX (US); Jafar Nahidi, Round Rock, TX (US); Dung Quoc Nguyen, Austin, TX (US); Jose Angel Paredes, Austin, TX (US); Scott Barnett Swaney, Catskill, NY (US); Brian William Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 11/054,988

(22) Filed: Feb. 10, 2005

(65) Prior Publication Data

US 2006/0179346 A1      Aug. 10, 2006

(51) Int. Cl.
  *G06F 11/00* (2006.01)
(52) U.S. Cl. .................... 714/13; 714/15; 712/218
(58) Field of Classification Search .............. 714/13, 714/15, 21; 712/218
  See application file for complete search history.

(56) References Cited

U.S. PATENT DOCUMENTS

| | | | | |
|---|---|---|---|---|
| 3,736,566 A | * | 5/1973 | Anderson et al. ............. | 714/15 |
| 4,493,035 A | * | 1/1985 | MacGregor et al. ........... | 714/21 |
| 5,367,705 A | * | 11/1994 | Sites et al. ..................... | 712/41 |
| 5,418,916 A | * | 5/1995 | Hall et al. ..................... | 712/228 |
| 5,467,473 A | * | 11/1995 | Kahle et al. ................... | 712/23 |
| 5,481,683 A | * | 1/1996 | Karim ........................ | 712/217 |
| 5,502,826 A | * | 3/1996 | Vassiliadis et al. ........... | 712/213 |
| 5,586,278 A | * | 12/1996 | Papworth et al. ............. | 712/235 |
| 5,659,721 A | * | 8/1997 | Shen et al. .................... | 712/228 |
| 5,692,121 A | | 11/1997 | Bozso et al. ........... | 395/182.11 |
| 5,740,414 A | * | 4/1998 | Tovey et al. ................. | 712/233 |
| 5,745,672 A | * | 4/1998 | Stiffler ......................... | 714/6 |
| 5,751,985 A | * | 5/1998 | Shen et al. ................... | 712/218 |
| 5,826,070 A | * | 10/1998 | Olson et al. ................. | 712/222 |
| 5,875,326 A | * | 2/1999 | Cheong et al. .............. | 712/244 |

(Continued)

OTHER PUBLICATIONS

Eisen et al., Processor Instruction Retry Recovery, Feb. 10, 2005.

*Primary Examiner*—Marc Duncan
*Assistant Examiner*—Joshua P Lottich
(74) *Attorney, Agent, or Firm*—Duke W. Yee; Diana L. Roberts-Gerhardt; Lisa L.B. Yociss

(57) ABSTRACT

A method and apparatus are provided for dispatch group checkpointing in a microprocessor, including provisions for handling partially completed dispatch groups and instructions which modify system coherent state prior to completion. An instruction checkpoint retry mechanism is implemented to recover from soft errors in logic. The processor is able to dispatch fixed point unit (FXU), load/store unit (LSU), and floating point unit (FPU) or vector multimedia extension (VMX) instructions on the same cycle. Store data is written to a store queue when a store instruction finishes executing. The data is held in the store queue until the store instruction is checkpointed, at which point it can be released to the coherently shared level 2 (L2) cache.

9 Claims, 5 Drawing Sheets

U.S. PATENT DOCUMENTS

| | | | |
|---|---|---|---|
| 5,884,061 A * | 3/1999 | Hesson et al. | 712/217 |
| 5,961,636 A * | 10/1999 | Brooks et al. | 712/228 |
| 5,978,896 A * | 11/1999 | Kahle et al. | 712/23 |
| 6,044,475 A * | 3/2000 | Chung et al. | 714/15 |
| 6,058,491 A * | 5/2000 | Bossen et al. | 714/15 |
| 6,105,148 A * | 8/2000 | Chung et al. | 714/16 |
| 6,286,094 B1 * | 9/2001 | Derrick et al. | 712/213 |
| 6,308,189 B1 * | 10/2001 | Nguyen | 708/209 |
| 6,308,260 B1 * | 10/2001 | Le et al. | 712/215 |
| 6,311,261 B1 * | 10/2001 | Chamdani et al. | 712/23 |
| 6,363,475 B1 * | 3/2002 | Dowling | 712/206 |
| 6,415,376 B1 * | 7/2002 | Mohamed et al. | 712/24 |
| 6,553,480 B1 * | 4/2003 | Cheong et al. | 712/23 |
| 6,581,155 B1 * | 6/2003 | Lohman et al. | 712/222 |
| 6,622,263 B1 * | 9/2003 | Stiffler et al. | 714/13 |
| 6,643,769 B1 * | 11/2003 | Huck et al. | 712/227 |
| 6,654,877 B1 * | 11/2003 | Huck et al. | 712/229 |
| 6,738,926 B2 * | 5/2004 | Mathiske et al. | 714/15 |
| 6,785,842 B2 * | 8/2004 | Zumkehr et al. | 714/17 |
| 6,802,024 B2 * | 10/2004 | Unice | 714/12 |
| 6,839,828 B2 * | 1/2005 | Gschwind et al. | 712/20 |
| 6,907,518 B1 * | 6/2005 | Lohman et al. | 712/222 |
| 6,968,476 B2 * | 11/2005 | Barowski et al. | 714/15 |
| 6,981,104 B2 * | 12/2005 | Prabhu | 711/144 |
| 7,013,383 B2 * | 3/2006 | Shelor | 712/244 |
| 7,015,718 B2 * | 3/2006 | Burky et al. | 326/40 |
| 7,093,106 B2 * | 8/2006 | Ambekar et al. | 712/217 |
| 7,120,762 B2 * | 10/2006 | Rajwar et al. | 711/150 |
| 7,158,520 B1 * | 1/2007 | Sindhu et al. | 370/392 |
| 7,180,893 B1 * | 2/2007 | Sindhu et al. | 370/392 |
| 7,194,603 B2 * | 3/2007 | Burky et al. | 712/216 |
| 7,212,530 B1 * | 5/2007 | Lim et al. | 370/392 |
| 7,213,135 B2 * | 5/2007 | Burky et al. | 712/244 |
| 7,215,662 B1 * | 5/2007 | Lim et al. | 370/352 |
| 7,236,501 B1 * | 6/2007 | Lim et al. | 370/470 |
| 7,239,630 B1 * | 7/2007 | Lim et al. | 370/353 |
| 7,243,262 B2 * | 7/2007 | Mukherjee et al. | 714/15 |
| 7,283,528 B1 * | 10/2007 | Lim et al. | 370/392 |
| 7,392,267 B2 * | 6/2008 | Cragun et al. | 707/203 |
| 2003/0005265 A1 * | 1/2003 | Barowski et al. | 712/218 |
| 2003/0037221 A1 * | 2/2003 | Gschwind et al. | 712/3 |
| 2003/0163763 A1 * | 8/2003 | DeLano | 714/15 |
| 2004/0010663 A1 * | 1/2004 | Prabhu | 711/143 |
| 2004/0024994 A1 * | 2/2004 | Kurihara et al. | 712/227 |
| 2004/0139440 A1 * | 7/2004 | Browning et al. | 718/107 |
| 2005/0050304 A1 * | 3/2005 | Mukherjee et al. | 712/218 |
| 2005/0050386 A1 * | 3/2005 | Reinhardt et al. | 714/13 |
| 2005/0120254 A1 * | 6/2005 | Suzuoki et al. | 713/320 |
| 2005/0138328 A1 * | 6/2005 | Moy et al. | 712/205 |
| 2007/0157138 A1 * | 7/2007 | Ciolfi et al. | 716/4 |
| 2007/0183425 A1 * | 8/2007 | Lim et al. | 370/392 |
| 2007/0277056 A1 * | 11/2007 | Varadarajan et al. | 714/15 |

* cited by examiner

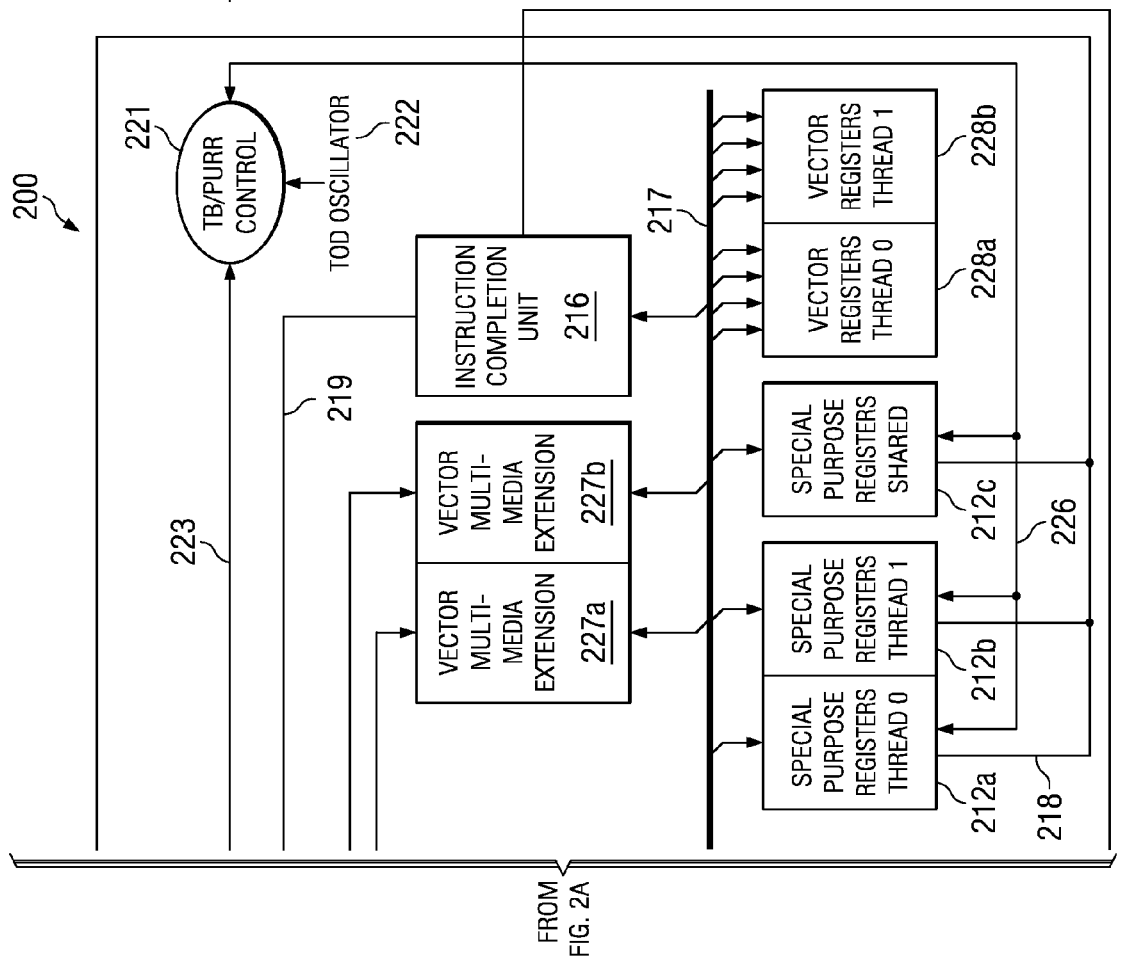

METHOD FOR CHECKPOINTING INSTRUCTION GROUPS WITH OUT-OF-ORDER FLOATING POINT INSTRUCTIONS IN A MULTI-THREADED PROCESSOR

CROSS-REFERENCE TO RELATED APPLICATION

The present application is related to co-pending application entitled "PROCESSOR INSTRUCTION RETRY RECOVERY," Ser. No. 11/055,528, filed on even date herewith. The above application is assigned to the same assignee and is incorporated herein by reference.

BACKGROUND OF THE INVENTION

1. Technical Field

The present invention relates to error detection in a data processing system. More specifically, the present invention is directed to a method and apparatus for checkpointing instruction groups with out-of-order floating point instructions in a multi-threaded processor.

2. Description of Related Art

Most data processing systems use mechanisms for detecting (and perhaps diagnosing) errors, as well as provide for the possibility of recovering from an error. These two functions are usually distinct, requiring different hardware (and software) mechanisms.

The RAS (Reliability, Availability, and Serviceability) concept, as implemented in hardware and software, is directed to preventing or recognizing system failures (Reliability), the ability to keep the system functioning in the event of failure (Availability), and the ability to fix the failure in a non-disruptive way (Serviceability). RAS may be addressed at various levels of system development; to diagnose design bugs during new product development, in manufacturing to identify bad parts during the system build, and to catch errors while the system is operating. RAS may also be directed to various types of failures, including system-level design oversights, logical errors, hard failures (hardware faults), or soft errors (data errors in memory or after data transfer due to external noise or circuit failure).

In some cases it is only necessary to recognize that an error has occurred. In others it is necessary to diagnose the error, that is, to specifically identify its source. Finally, in some cases it is desirable to remove or correct the error.

A commonly used method of error detection utilizes parity codes. In a one-bit parity code the number of binary "ones" (1s) in a data word are counted. The word has odd parity if the number of 1s is odd and even parity otherwise. When a word is written into memory, the parity bit is also written. The parity bit is read and checked when the word is read out. If the stored and checked parity bits do not match, an error is detected. A one-bit parity code can detect at most one bit of error in the data item. If there are two bits of error the one-bit parity code will not detect any error since the parity will match the data with two errors.

While a one-bit parity code can detect an error, it cannot detect which particular bit in a data item is in error. Error correcting codes (ECCs), on the other hand, not only detect, but allow correction of an error. Many large memory systems use single error correcting, double error detecting (SEC-DED) code that allows detection of up to 2-bits of error and correction of a single bit of error. An error may be detected and corrected in a number of ways, including system software or by circuitry that is integral to the particular component that generates the error.

In traditional commercial-design, EDFI (Error Detection and Fault Isolation) was achieved via special checking-logic that was integral to the data flow and control. Error detection refers to the percentage of errors that could reasonably be detected, perhaps by using the parity schemes as discussed above. The error detection capability of such systems was high (e.g., 75%-90% of hardware faults detected). Fault isolation refers to percentage of errors that could be traced to a particular component. The fault isolation of these conventional systems was also good (e.g., about 90% of the errors could be traced to a single component).

While valuable for preserving data integrity, EDFI schemes are not without their disadvantages. In conventional mainframe designs, all logical circuits were checked as the system was operating. In many cases, however, the checking-logic (e.g. parity code predictors) were as complex as the circuit components (e.g, adders or shifters) themselves. This results in larger processors with circuits driving longer wires with more fan out, and generally longer cycle times.

The above described strategy uses the same fundamental concepts as existing zSeries processors, where a recovery unit (Runit) maintains an error correction code (ECC) hardened checkpointed copy of all architected registers which can be restored in case of an error, with processing resumed from the restored checkpoint. The basic Runit concept is that working copies of registers are integrated with the execution pipelines, and are updated and available for use as soon as an instruction finishes executing, while a separate copy of all registers are held in an ECC hardened checkpoint array. Updates to the checkpoint array are delayed from the working registers to allow for error detection and reporting, where a reported error blocks all further checkpoint updates so that the checkpoint remains intact at a coherent instruction boundary. Register updates are accumulated in a write queue until ready for checkpointing and then drained from the write queue into the checkpoint array.

Prior Runit implementations rely on fixed pipeline lengths to determine the checkpoint boundary, which does not support executing instructions out-of-order with different execution pipeline depths because checkpointing of instructions must always be in order.

Thus, it would be advantageous to provide a mechanism and apparatus for checkpointing instruction groups with out-of-order floating point instructions in a multi-threaded processor.

SUMMARY OF THE INVENTION

The present invention provides a method and apparatus for dispatch group checkpointing in a microprocessor, including provisions for handling partially completed dispatch groups. In the present invention, an instruction checkpoint retry mechanism is implemented to recover from soft errors in logic. The present invention makes use of a processor that is able to dispatch fixed point unit (FXU), load/store unit (LSU), and floating point unit (FPU) or vector multimedia extension (VMX) instructions on the same cycle. Store data is written to a store queue when a store instruction finishes executing. The data is held in the store queue until the store instruction is checkpointed, at which point it can be released to the coherently shared level 2 (L2) cache.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 2A-2B depict an exemplary block diagram of a dual threaded processor design showing functional units and registers in accordance with a preferred embodiment of the present invention is shown;

DETAILED DESCRIPTION OF THE PREFERRED EMBODIMENT

Figure 1:
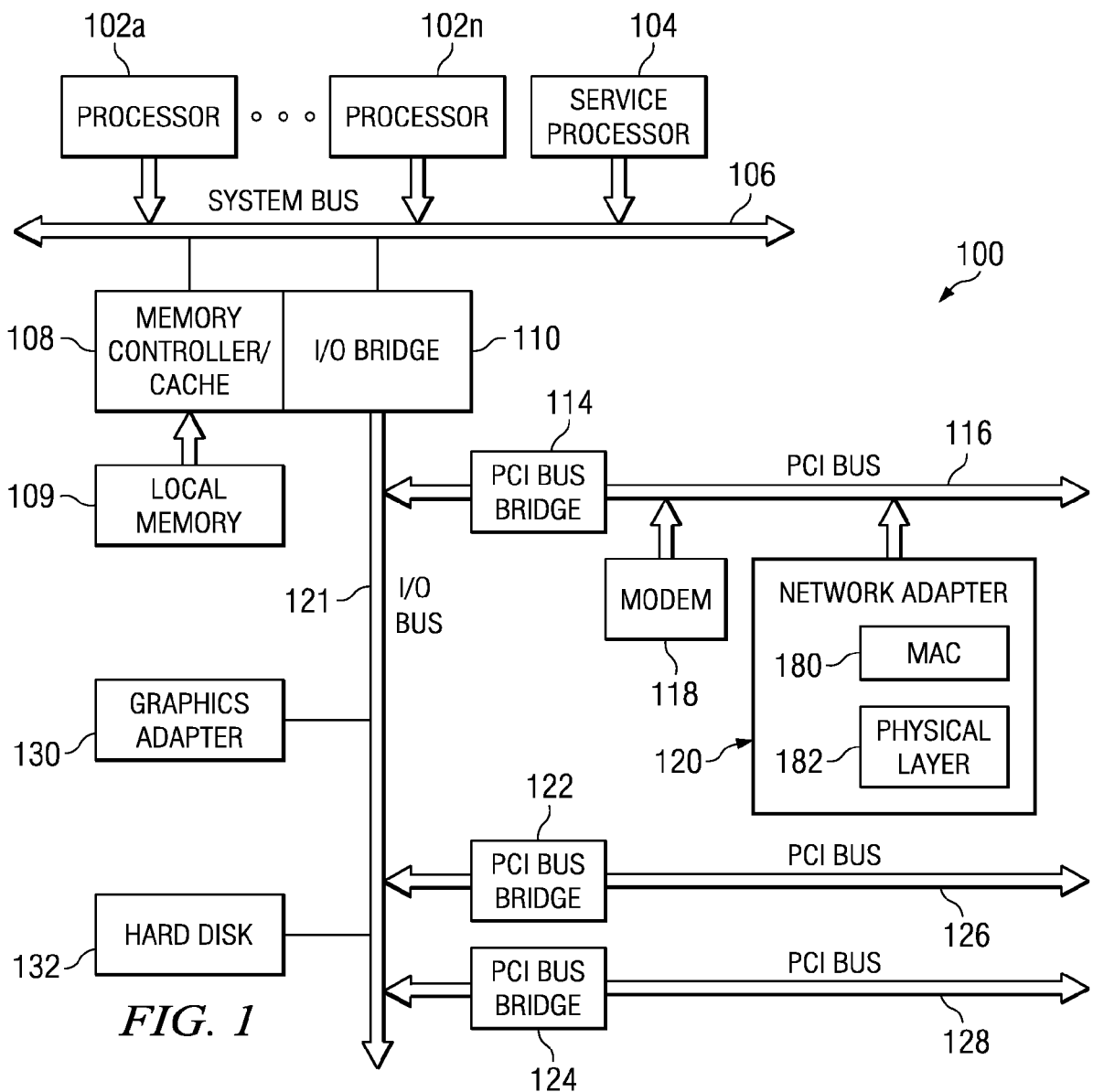
FIG. 1 depicts a block diagram of a data processing system that may be implemented in accordance with a preferred embodiment of the present invention.

The present invention provides a method and apparatus for checkpointing instruction groups with out-of-order floating point instructions in a multi-threaded processor. The present invention provides a processor that implements an instruction checkpoint retry mechanism to recover from soft errors in logic. The present invention uses some of the same fundamental concepts as existing processors, where a recovery unit (Runit) maintains an Error Correcting Code (ECC) hardened checkpointed copy of all architected registers which can be restored in case of an error, with processing resumed from the restored checkpoint. However, there are shortcomings of existing Runit implementations which are solved by this invention.

The present invention provides support for prior art limitations such as fixed point unit (FXU), and floating point unit (FPU) or vector multimedia extension (VMX) operations that are dispatched in the same instruction group, out-of-order FPU and VMX operations, single point of control for blocking checkpointing in a non-mirrored processor, and instructions which modify system coherent state prior to completion.

To meet performance goals, the present invention describes a processor that is able to dispatch fixed point unit (FXU), load/store unit (LSU), and floating point unit (FPU) or vector multimedia extension (VMX) instructions on the same cycle. Either FPU or VMX instructions are dispatched in the same group with fixed point instructions. FPU and VMX instructions are never dispatched in the same group. The FXU and LSU execution pipelines are the same depth, but are shorter than the FPU and VMX pipelines. Also, FPU instructions can execute out-of-order with respect to each other and with respect to FXU and LSU instructions. VMX instructions will always complete last with respect to FXU and LSU instructions. This demands a different method of managing the checkpoint boundary, which this invention provides.

Storage is also an integral part of the processor checkpoint. Store data is written to a store queue when a store instruction finishes executing. The data must be held in the store queue until the store instruction is checkpointed, at which point it can be released to the coherently shared level 2 (L2) cache. Again, prior implementations of the checkpoint relied on a fixed pipeline timing to checkpoint data in the store queue. Since both the register and storage checkpoints relied on fixed pipeline timing, their controls were independent. This had the drawback that a detected error had to be reported to both the Runit and store queue to block checkpointing in both places. This created cycle-time critical paths even with the mirrored processor design which had virtually the entire error detection local to the Runit and store queue. In a non-mirrored processor design, error detection is implemented throughout all the functional units of the processor, which makes it increasingly difficult to report all errors to two different places in time to block checkpointing. This invention provides a single point of control to block all checkpointing.

Also provided are instructions which modify system coherent resources prior to being finished. The store conditional (STCX) instruction conditionally sets a lock, but the instruction cannot finish, or hence checkpoint, until the condition code is returned which indicates whether the lock was set or not. Some cache-inhibited (CI) load instructions automatically increment queue pointers in I/O devices, but cannot finish, or hence checkpoint, until the load data is returned and written to the target register. Normally a reported error blocks the checkpoint, working copies of registers are restored from the checkpointed copies, and processing resumes from the prior checkpoint. However, since these STCX/CI-Load type instructions modify system coherent state prior to finishing/checkpointing, they may not be retried after an error if already started prior to the error. This invention allows for special handling for STCX/CI-Load type operations.

In order to reduce the cost of tracking speculative instruction results, the present invention tracks instructions by dispatch group; i.e. instructions may be dispatched in program order to multiple execution units in any given processor cycle, and all instructions dispatched in the same cycle will be tracked and checkpointed together. Thus, the fixed point instructions and FPU or VMX instructions of the same dispatch group will be checkpointed together. An instruction group can only be checkpointed when all instructions in that group have passed the completion point. The processor can partially checkpoint each dispatch group since instructions in the dispatch group such as branch instructions, load/store instructions, or other exception causing instructions can cause the group to be partially flushed out, due to speculative execution. The cost of managing the instruction checkpoint by dispatch group is low compared with tracking each instruction individually.

At the time of dispatch, a group tag (Gtag) is sent along with the instructions to denote the age of the group relative to each instruction tag (Itag), and will be used to determine when a group can be checkpointed. A group can be checkpointed when the next-to-complete Itag (NTC Itag) is equal to or greater than the Gtag. When a group is partially flushed due to branch misprediction, load/store reject, or exception causing instruction, a new Gtag must be recalculated and saved by the recovery unit. This information is used to allow the recovery unit to partially checkpoint the original dispatch group while discarding data of the flushed instructions.

Since fixed point instructions and FPU or VMX instructions are executed out-of-order with respect to each other, with the FPU and VMX instructions taking longer to execute than the fixed point instructions, the fixed point instructions will finish before the FPU or VMX instructions. Thus the fixed point data must wait at the recovery unit for the FPU or VMX instructions in the same dispatched group to be completed before the whole dispatch group can be checkpointed. The FPU and VMX instruction results are kept in separate queues from the fixed point instruction results. At dispatch time, the number of FPU instructions results expected from the dispatch group, and whether or not VMX instruction results are expected, is sent along with the dispatching instructions to the checkpoint queues in the recovery unit. The group can only be checkpointed when all FPU or VMX data for that group is available. If a dispatch group is partially flushed, and if any of the younger FPU or all of the VMX instructions in the group is also flushed out, then the number of FPU instructions in the group is recalculated along with the new Gtag. The new number of FPU instructions is also kept by the recovery unit to allow partially checkpoint of the dispatch group.

Note that the present invention describes a processor that is dual threaded, but the checkpointing of the registers for each thread is independent. The Runit essentially separates the results for each thread into separate, duplicate resources.

The present invention handles errors in a processor core by using backed up register and buffer values in place of data known to be, at least in part, in error, e.g. as caused by random incident radiation.

Referring to FIG. 1, a block diagram of a data processing system that may be implemented as a server is depicted in accordance with a preferred embodiment of the present invention. Data processing system 100 may be a symmetric multiprocessor (SMP) system including a plurality of SMT-capable processors 102a-102n connected to system bus 106. Alternatively, a single processor system may be employed. All of the processors described herein with reference to all of the figures are superscalar, SMT-capable processors. Each superscalar, SMT-capable processor is capable of concurrently executing multiple threads on the one processor with varied amount of resources allocated to each thread. Further, each thread will have assigned to it a hardware priority that the processor will use when determining what and how many of the superscalar resources and processing cycles to grant to a particular thread.

Also connected to system bus 106 is memory controller/cache 108, which provides an interface to local memory 109. I/O bus bridge 110 is connected to system bus 106 and provides an interface to I/O bus 121. Memory controller/cache 108 and I/O bus bridge 110 may be integrated as depicted.

Peripheral component interconnect (PCI) bus bridge 114 connected to I/O bus 121 provides an interface to PCI local bus 116. A number of modems may be connected to PCI local bus 116. Typical PCI bus implementations will support four PCI expansion slots or add-in connectors. Communications links to network computers may be provided through modem 118 and network adapter 120 connected to PCI local bus 116 through add-in connectors.

Network adapter 120 includes a physical layer 182 which conditions analog signals to go out to the network, such as for example an Ethernet network over an R45 connector. A media access controller (MAC) 180 is included within network adapter 120. MAC 180 is coupled to bus 116 and processes digital network signals. MAC 180 serves as an interface between bus 116 and physical layer 182. MAC 180 performs a number of functions involved in the transmission and reception of data packets. For example, during the transmission of data, MAC 180 assembles the data to be transmitted into a packet with address and error detection fields. Conversely, during the reception of a packet, MAC 180 disassembles the packet and performs address checking and error detection. In addition, MAC 180 typically performs encoding/decoding of digital signals transmitted and performs preamble generation/removal as well as bit transmission/reception.

Additional PCI bus bridges 122 and 124 provide interfaces for additional PCI local buses 126 and 128, from which additional modems or network adapters may be supported. In this manner, data processing system 100 allows connections to multiple network computers. A memory-mapped graphics adapter 130 and hard disk 132 may also be connected to I/O bus 121 as depicted, either directly or indirectly.

Service processor 104 interrogates system processors, memory components, and I/O bridges to generate an inventory and topology understanding of data processing system 100. Service processor 104 also executes built-in-self-tests (BISTs), basic assurance tests (BATs), and memory tests on all elements found by interrogating a system processor, memory controller, and I/O bridge. Any error information for failures detected during the BISTs, BATs, and memory tests are gathered and reported by Service Processor 104.

System Bus 106 can be connected to one or more like system busses which allows the data processing system to be incrementally scaled up to a large n-way SMP.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2A:
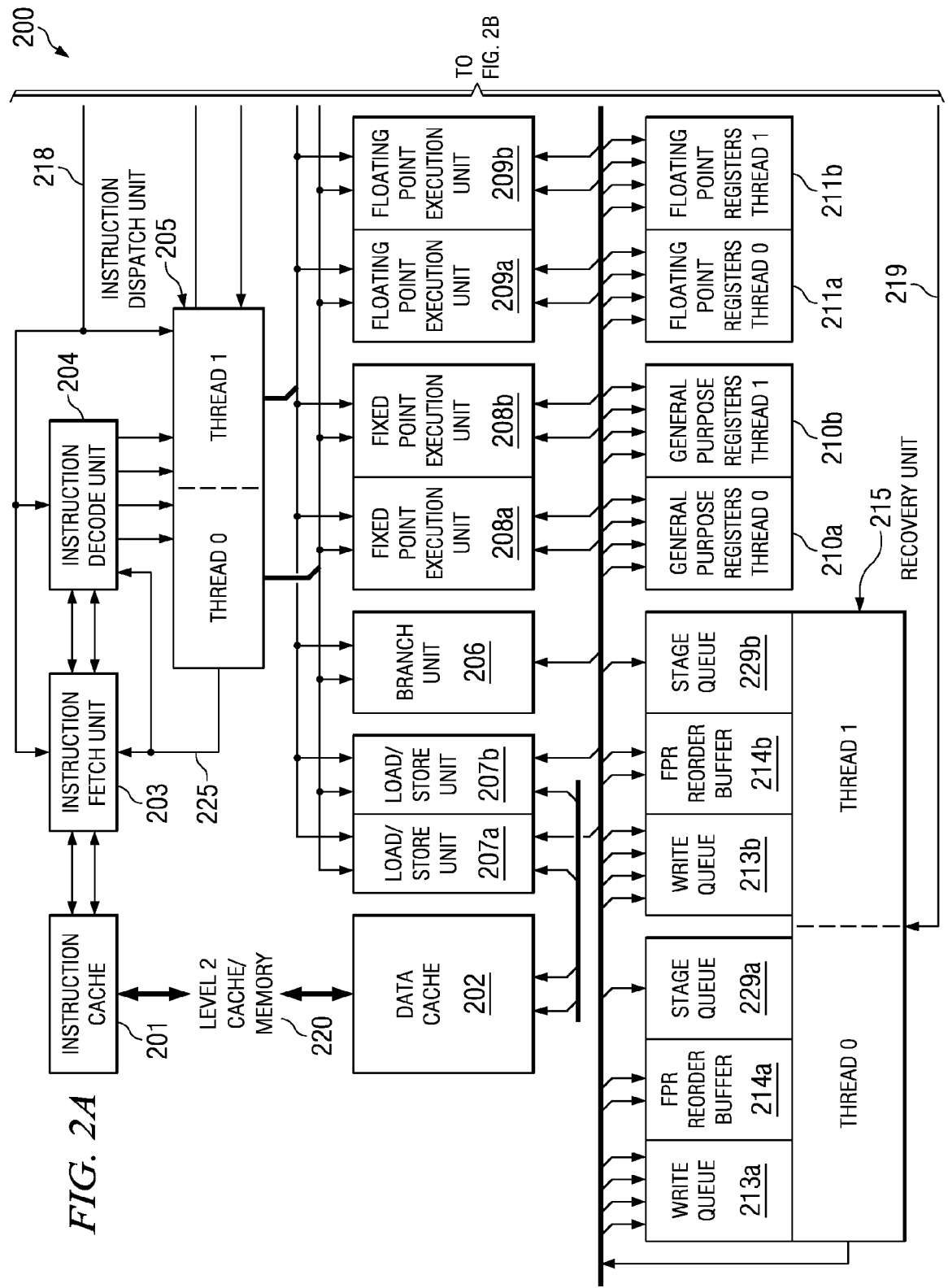

Referring to FIGS. 2A-2B, an exemplary block diagram of a dual threaded processor design showing functional units and registers in accordance with a preferred embodiment of the present invention is shown. The processor is generally designated by reference number 200, and may be implemented as one of processors 102a-102n in FIG. 1. Processor 200 comprises a single integrated circuit superscalar microprocessor with dual-thread SMT. Accordingly, as discussed further herein below, processor includes various units, registers, buffers, memories, and other sections, all of which are formed by integrated circuitry. Also, in a preferred embodiment of the present invention, processor 200 operates according to reduced instruction set computer ("RISC") techniques.

As shown in FIGS. 2A-2B, instruction fetch unit (IFU) 203 is connected to instruction cache 201. Instruction cache 201 holds instructions for multiple programs (threads) to be executed. Instruction cache 201 also has an interface to level 2 (L2) cache/memory 220. IFU 203 requests instructions from instruction cache 201 according to an instruction address, and passes instructions to instruction decode unit 204. In a preferred embodiment of the present invention, IFU 203 can request multiple instructions from instruction cache 201 for up to two threads at the same time. Instruction decode unit 204 decodes multiple instructions for up to two threads at the same time and passes decoded instructions to instruction dispatch unit (IDU) 205. IDU 205 selectively groups decoded instructions from instruction decode unit 204 for each thread, and outputs a group of instructions for each thread to execution circuitry 206, 207a, 207b, 208a, 208b, 209a, 209b, 227a and 227b of the processor.

In a preferred embodiment of the present invention, the execution circuitry of the processor may include, branch unit 206, fixed-point execution units (FXUA) 208a and (FXUB) 208b, load/store units (LSUA) 207a and (LSUB) 207b, floating-point execution units (FPUA) 209a and (FPUB) 209b, and vector multimedia extension units (VMXA) 227a and (VMXB) 227b. Execution units 206, 207a, 207b, 208a, 208b, 209a, 209b, 227a and 227b are fully shared across both threads. The processor includes multiple register sets 210a, 210b, 211a, 211b, 212a, 212b, 212c, 228a, and 228b separately for each of the two threads, namely general purpose registers (GPR) 210a and 210b, floating-point registers (FPR) 211a and 211b, special purpose registers (SPR) 212a and 212b and vector register (VR) 228a and 228b. The processor additionally includes a set of SPRs 212c which is shared across both threads. Simplified internal bus structure 217 is shown to depict connections between execution units 206, 207a, 207b, 208a, 208b, 209a, 209b, 227a and 227b and register sets 210a, 210b, 211a, 211b, 212a, 212b, 212c, 228a, and 228b.

FPUA 209a and FPUB 209b input their register source operand information from and output their destination register operand data to FPRs 211a and 211b according to which thread each executing instruction belongs to. FXUA 208a, FXUB 208b, LSUA 207a, and LSUB 207b input their register source operand information from and output their destination register operand data to GPRs 210a and 210b according to which thread each executing instruction belongs to. A subset of instructions executed by FXUA 208a, FXUB 208b, and branch unit 206 use SPRs 212a, 212b and 212c as source and destination operand registers. LSUA 207a and LSUB 207b input their storage operands from and output their storage operands to data cache 202 which stores operand data for multiple programs (threads). VMXA 227a and VMXB 227b input their register source operand information from and output their destination register operand data to VRs 228a and 228b according to which thread each executing instruction belongs to. Data cache 202 also has an interface to level 2 cache/memory 220.

Level 2 cache 202 may also have (not shown) associated with it a non-cacheable unit which accepts data from the processor and writes it directly to memory 220, thus bypassing the coherency protocols required for storage to cache.

In response to the instructions input from instruction cache 201 and decoded by instruction decode unit 204, IDU 205 selectively dispatches the instructions to execution units 206, 207a, 207b, 208a, 208b, 209a, and 209b, 227a and 227b. Execution units 206, 207a, 207b, 208a, 208b, 209a, 209b, 227a and 227b execute one or more instructions of a particular class of instructions. For example, FXUA 208a and FXUB 208b execute fixed-point mathematical operations on register source operands, such as addition, subtraction, ANDing, ORing and XORing. FPUA 209a and FPUB 209b execute floating-point mathematical operations on register source operands, such as floating-point multiplication and division. LSUA 207a and LSUB 207b execute load and store instructions which move operand data between data cache 202 and registers 210a, 210b, 211a, and 211b. VMXA 227a and VMXB 227b execute single instruction operations that include multiple data. Branch unit 206 executes branch instructions which conditionally alter the flow of execution through a program by modifying the instruction address used by IFU 203 to request instructions from instruction cache 201.

IDU 205 groups together decoded instructions to be executed at the same time, depending on the mix of decoded instructions and available execution units 206, 207a, 207b, 208a, 208b, 209a, 209b, 227a and 227b to perform the required operation for each instruction. For example, because there are only two load/Store units 207a and 207b, a maximum of two load/store type instructions may be grouped together. In a preferred embodiment of the present invention, up to seven instructions may be grouped together (two fixed-point arithmetic, two load/store, two floating-point arithmetic or two vector multimedia extension, and one branch), and up to five instructions may belong to the same thread. IDU 205 includes in the group as many instructions as possible from the higher priority thread, up to five, before including instructions from the lower priority thread. However, either FPU instructions 209a and 209b or VMX instructions 227a and 227b are dispatched in the same group with fixed point instructions. FPU instructions 209a and 209b and VMX instructions 227a and 227b are never dispatched in the same group. Values in special purpose registers 212a and 212b indicate thread priority 218 to IDU 205.

Instruction completion unit 216 monitors internal bus structure 217 to determine when instructions executing in execution units 206, 207a, 207b, 208a, 208b, 209a, 209b, 227a and 227b are finished writing their operand results. Instructions executed by branch unit 206, FXUA 208a, FXUB 208b, LSUA 207a, and LSUB 207b require the same number of cycles to execute, while instructions executed by FPUA 209a, FPUB 209b, VMXA 227a and VMXB 228b require a variable, and a larger number of cycles to execute. Therefore, instructions that are grouped together and start executing at the same time do not necessarily finish executing at the same time. When all the instructions grouped together within a thread are finished writing their operand results, the group is said to be "completed."

Instruction completion unit 216 monitors for the completion of instruction, and sends control information 219 to IDU 205 to identify that more groups of instructions can be dispatched to execution units 206, 207a, 207b, 208a, 208b, 209a, 209b, 227a and 227b. IDU 205 sends control information 225 to IFU 203 and instruction decode unit 204 to indicate that it is ready to receive more decoded instructions.

Processor 200 preferably also includes error detection circuitry (not shown on FIGS. 2A-2B) throughout all functional units, and recovery unit 215 which contains a backup copy of registers 210a, 210b, 211a, 211b, 212a, 212b, 212c, 227a, and 227b for both threads. Results written to register sets 210a, 210b, 211a, 211b, 212a, 212b, 212c, 227a, and 227b are also written to queue structures 213a, 213b, 214a, 214b, 229a, and 229b over internal bus structure 217. Register results from branch unit 206, FXUA 208a, FXUB 208b, LSUA 207a, and LSUB 207b are held in write queue 213a and 213b according to which thread the associated instruction belongs to. Register results from VMXA 227a and VMXB 227b are held in stage queue 229a and 229b according to which thread the associated instruction belongs to. Write queue 213a and 213b for each thread is a simple first-in-first-out (FIFO) queue structure. Because instructions executed by FPUA 209a and FPUB 209b require a variable, and a larger number of cycles to execute, and may complete out-of-order, these results are written to FPR reorder buffer 214a and 214b according to which thread the associated instruction belongs to. FPR reorder buffer 214a and 214b arranges for each thread the results from FPUA 209a and FPUB 209b in the sequence which the associated instructions occurred in the program originally supplied by instruction cache 201.

The register results are held in write queue 213a and 213b, FPR reorder buffer 214a and 214b, and stage queue 229a and 229b for each thread until completion unit 216 indicates (via control 219) that all instructions in the group have completed for each thread. If no errors are reported by the error detection circuitry (not shown in FIGS. 2A-2B), the results are drained from queue structures 213a, 213b, 214a, 214b, 229a, and 229b into the backup copy of the associated registers in recovery unit 215. In the event of an error, recovery unit 215 discards the contents of write queue 213a and 213b, FPR reorder buffer 214a and 214b, and stage queue 229a and 229b for each thread, and restores the backup copy of register sets 210a, 210b, 211a, 211b, 212a, 212b, 212c, 228a, and 228b using internal bus structure 217.

Processing may then be resumed from the known error-free instruction boundary. The process of copying, storing for a time and discarding such sets is known as checkpointing. There may be several such sets or backup copies stored in the recovery unit 215, and each set may be discarded on a FIFO basis, wherein each successive set represents the state of the registers after processing each group of instructions, wherein each set is known as a checkpoint.

Some of SPRs 212a, 212b, and 212c hold information used to control the operation of the various functional units. This is represented, simplified, in FIGS. 2A-2B by connection 218. SPRs 212a and 212b have separate copies for each thread, while 212c is shared across all threads. Not limited to these examples, SPRs 212a, 212b, and 212c may include instruction addresses, thread priority control, condition code, save/restore addresses, machine state, etc.

Scattered among the units and registers of the processor core 200, are a number of circuits known as pervasives core. Such circuits are driven by a system clock that may be turned off or blocked to all simultaneously. The circuits draw little power and consequently generate little heat while no clocking is provided to them. The circuits include functions such as overriding the normal operation of their host units and placing their respective hosts into a recovery mode.

In a preferred embodiment of the present invention, the superscalar processor has two fixed point execution pipelines (FXU), two load/store pipelines (LSU), two floating point execution pipelines (FPU), two vector multimedia extension pipelines (VMX) and one branch execution pipeline (BRU). The processor supports executing two independent instruction streams (threads) simultaneously. It can dispatch up to seven instructions each processor cycle, across both threads, with up to five instructions from the same thread. The FXU and LSU execution pipelines are the same depth, but are shorter than the FPU or VMX pipelines. Instructions that execute in the FXU and LSU execute in-order with respect to each other, but out-of-order with respect to instructions which execute in the FPU or VMX. Instructions which execute in the FPU execute out-of-order with respect to each other, and with respect to the FXU/LSU/BRU. VMX instructions take longer to execute than FXU/LSU/BRU instructions, and hence complete out-of-order with respect to them. Floating point loads are executed by the LSU, so both the LSU and FPU pipelines can update floating point registers (FPRs).

Working copies of registers are maintained in register files integrated within the execution pipelines, general purpose registers (GPRs) in the FXU, floating point registers (FPRs) in the FPU. These working copies are updated, and available for further use, as soon as an instruction finishes executing, while a separate checkpointed copy of all registers is maintained in an ECC protected checkpoint array (set of register files). Updates to the checkpoint array are delayed from the working registers to allow for error detection and reporting, where a reported error blocks all further checkpoint updates so that the checkpoint remains intact at a coherent instruction boundary.

The handling of branches is not significant to this invention, nor is the handling of the multiple threads. Although easily expandable across many independent threads, using separate, duplicate resources, this invention specifically applies to the managing of the checkpoint within a thread. There are also several dedicated interfaces for managing special purpose registers (SPRs), but unless explicitly noted, they are not significant to this invention.

Checkpoint management is primarily controlled by a recovery unit (Runit). The Runit contains queues to accumulate register results from the pipelines until they are ready to be checkpointed (write queues), and the register files that make up the checkpoint array. The checkpoint is maintained on an instruction group boundary.

Figure 3:
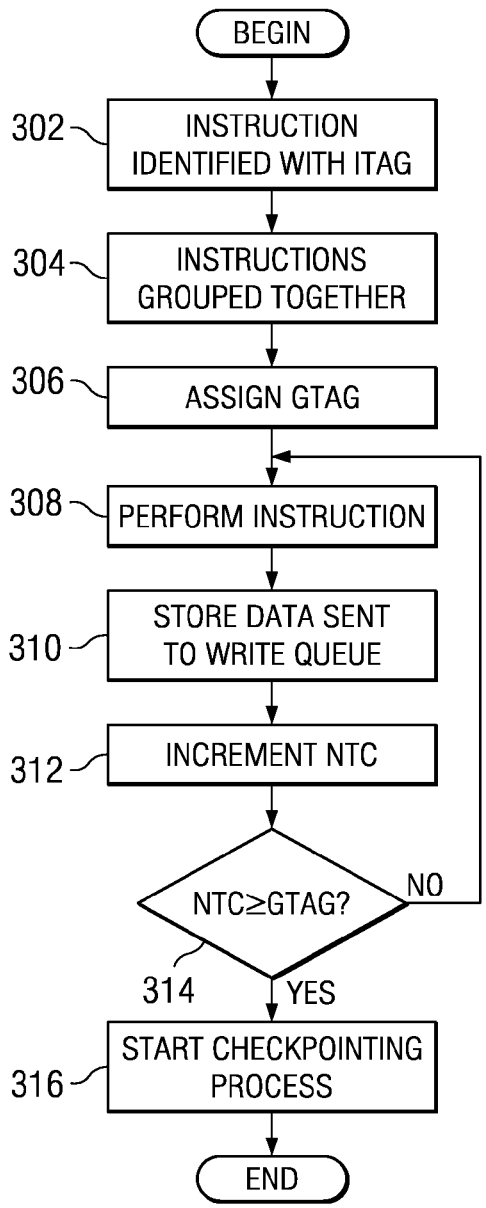
FIG. 3 illustrates a flowchart of an exemplary operation of instruction implementation in accordance with a preferred embodiment of the present invention.

Turning to FIG. 3, the depicted flowchart illustrates an exemplary operation of instruction implementation in accordance with a preferred embodiment of the present invention. As the operation begins, each instruction is identified by an instruction tag (Itag) (block 302). Then the instructions are grouped together early in the pipeline and dispatched to the execution pipelines as a group (block 304). Itags are assigned sequentially so that the "oldest" instruction in a group has the smallest Itag. Each group of instructions is assigned a group tag (Gtag) for each thread, which is 1+the Itag of the youngest instruction in the group, which means it is the same as the Itag of the oldest instruction of the next group (block 306). As the operation continues, the instructions are performed (block 308) and the results (store data) are sent to a write queue (block 310). Completion logic keeps track of which outstanding instructions have finished executing, and maintains a next-to-complete (NTC) Itag, which points to the instruction address of the oldest instruction which has not finished executing yet and is incremented with each instruction group (block 312). If the NTC is not greater than the Gtag, the operation returns to block 308 where the next instruction is performed. When the NTC Itag is greater than or equal to a Gtag, it indicates that all the instructions in the group have finished executing and results can be checkpointed (block 316) and this operation ends.

Because the FPU can execute instructions out-of-order with respect to the FXU, LSU and BRU, the Runit has two separate write queues, one for FPU results called the floating point write queue (FPWQ), and one for FXU, LSU and BRU results called the fixed point write queue (FXWQ). The FXWQ for the FXU, LSU and BRU is a simple FIFO, but the FPWQ for the FPU is a re-order buffer which has slots assigned in order, but gets loaded corresponding to the order that the FPU executes instructions. Because VMX unit instructions complete in-order and are guaranteed to be the latest completing instructions in a group, when VMX instructions complete, the entire group will checkpoint (unless an exception condition is encountered.) Thus, the Runit uses a staging register (queue of depth 1) for VMX results. The Gtag is included with the result busses to the Runit for the FXU/LSU/BRU so the Runit knows which instruction group the register updates are for. It is possible that multiple instruction groups could be finished, but waiting on a FPU op from an older group to finish because it executed out of order. When the older instruction finally finishes, the NTC Itag may jump ahead multiple groups. This means that both the FXU/LSU and FPU write queues will then have instruction groups that are ready to drain into the checkpoint array.

Thus, as the FXU/LSU/BRU finish executing instructions, the FXU/LSU/BRU results along with finish valids, and the general purpose register (GPR)/condition code register (CR)/fixed point exception register (XER) target register addresses are sent to the Runit. Only non-flushed instructions will generate finish valids, which indicate that the instruction was not flushed. The finished instruction tags (ITag) and instruction finish valids are sent to the Completion Unit. At the Runit, the FXU/LSU/BRU results, GPR/CR/XER address, and finish valids are written into the fixed point write queue (FXWQ). For each entry in the FXWQ, there is a corresponding GTAG and number of floating point instructions (#FPU) for that group. This entry will be held until it can be checkpointed and transferred its data to the Checkpoint GPR.

Additionally, as the FPU finishes executing instructions, the FPU results along with the FPR target register addresses are sent to the Runit. Again, only non-flushed instructions will generate finish valids. The finished ITAG and instruction finish valids are sent to the completion unit. At the Runit, the FPU results, FPR address, and finish valids are written into the floating point write queue (FPWQ); this entry will be held until it can be checkpointed and transferred its data to the checkpoint FPR.

Additionally, as the VMX unit finishes executing instructions, the VMX results along with the VMX target register addresses are sent to the Runit. Again, only non-flushed instructions will generate finish valids. The finished ITAG, instruction finish valids are sent to the completion unit. At the Runit, the VMX results, VMX address, and finish valids are written into the VMX staging register); this entry will be held until it can be checkpointed and transferred its data to the checkpoint vector register (VR).

It is possible to have FXU/LSU/BRU and FPU or VMX instructions in the same group, but not required, which means the oldest entries in the two write queues could be from the same or different instruction groups. Because the FPU and FXU can both update FPRs, and the VMX and FXU can both update VRs, we need to avoid cases where write queues for the LSU and FPU or VMX unit are trying to drain entries to the same FPR or VR. The instruction grouping algorithms avoid such collisions with the same group, but the Runit must ensure that draining from the write queues into the checkpoint array is always on an instruction group boundary. In the case where the NTC Itag jumps multiple groups ahead, we need a mechanism to identify where the group boundaries are across the two write queues. This is done by providing two bits along with the Gtag to identify how many FPU instructions (#FPU) were included in the group (with a value of three indicating that VMX operations are included in the group. The Gtag and #FPU instructions bits are included in the FXWQ entry. The FXWQ entry is used even if there are no FXU or LSU instructions in the group. This prevents the oldest entries from the two write queues from containing values that want to checkpoint from two different groups. The bits in the #FPU field identify how many instructions to drain from the FPWQ for that group, or that VR results are expected at all.

Using the NTC Itag/Gtag compare allows variable delay for out of order processing in the different length pipelines, with FXU/LSU/BRU and FPU or VMX instructions in the same group. Always using a FXWQ entry, with bits to identify how many entries to drain from the FPWQ, prevents having a collision between the LSU and FPU or VMX write queues trying to update the checkpoint for the same FPR or VR.

Figure 4:
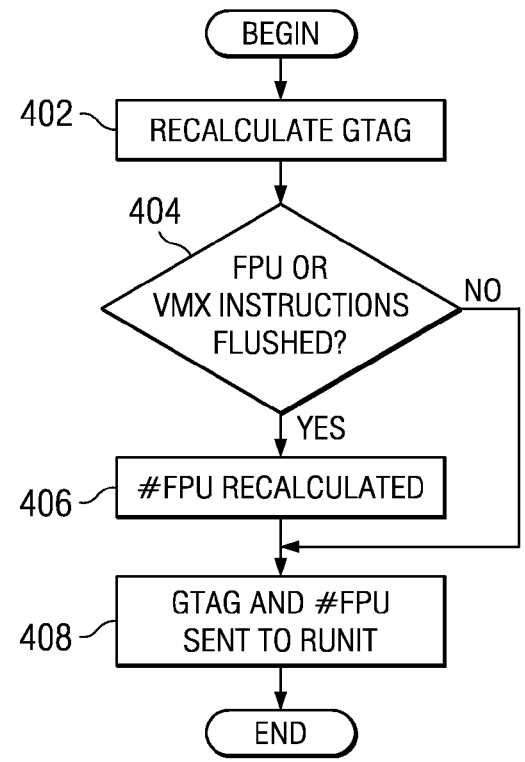
FIG. 4 illustrates a flowchart as a further aspect of the Gtag assignment in accordance with a preferred embodiment of the present invention.

FIG. 4 is a flowchart illustrating a further aspect of the Gtag assignment (block 306 of FIG. 3) in accordance with a preferred embodiment of the present invention. If the current dispatch group is being flushed out partially due to a branch mispredict (from a branch in the same dispatch group), by a LSU reject (from a load in the same dispatch group), or by a fixed point exception causing instruction (from a trap instruction, e.g.), then the GTAG is recalculated to be resent to the Runit (block 402). The recalculated GTAG is now pointed to the ITAG of the youngest instruction remaining in the group +1. This will allow the Runit to only partially checkpoint the original dispatch group up to the flushed instruction. Also, a determination is made whether any FPU or VMX instructions were also flushed out (block 404). If any FPU or VMX instructions are flushed out, then the #FPU of the group is also recalculated at this time to indicate how many FPU instructions, or if VMX instructions are remaining in the original dispatch group (block 406). Then new #FPU is also sent along with the newly recalculated Gtag to the Runit (block 408). If at block 404, no FPU or VMX instructions are flushed out, then the recalculated Gtag and the existing #FPU are sent to the Runit (block 408).

As mentioned above, the finish ITags and finish valids are sent to the completion unit for processing. The completion unit will complete the finished instructions, and then increment the ITag to point to the next instruction to be completed (NTC ITag). The NTC Itag is then sent to the Runit to use for checkpointing the completed instruction group.

Figure 5:
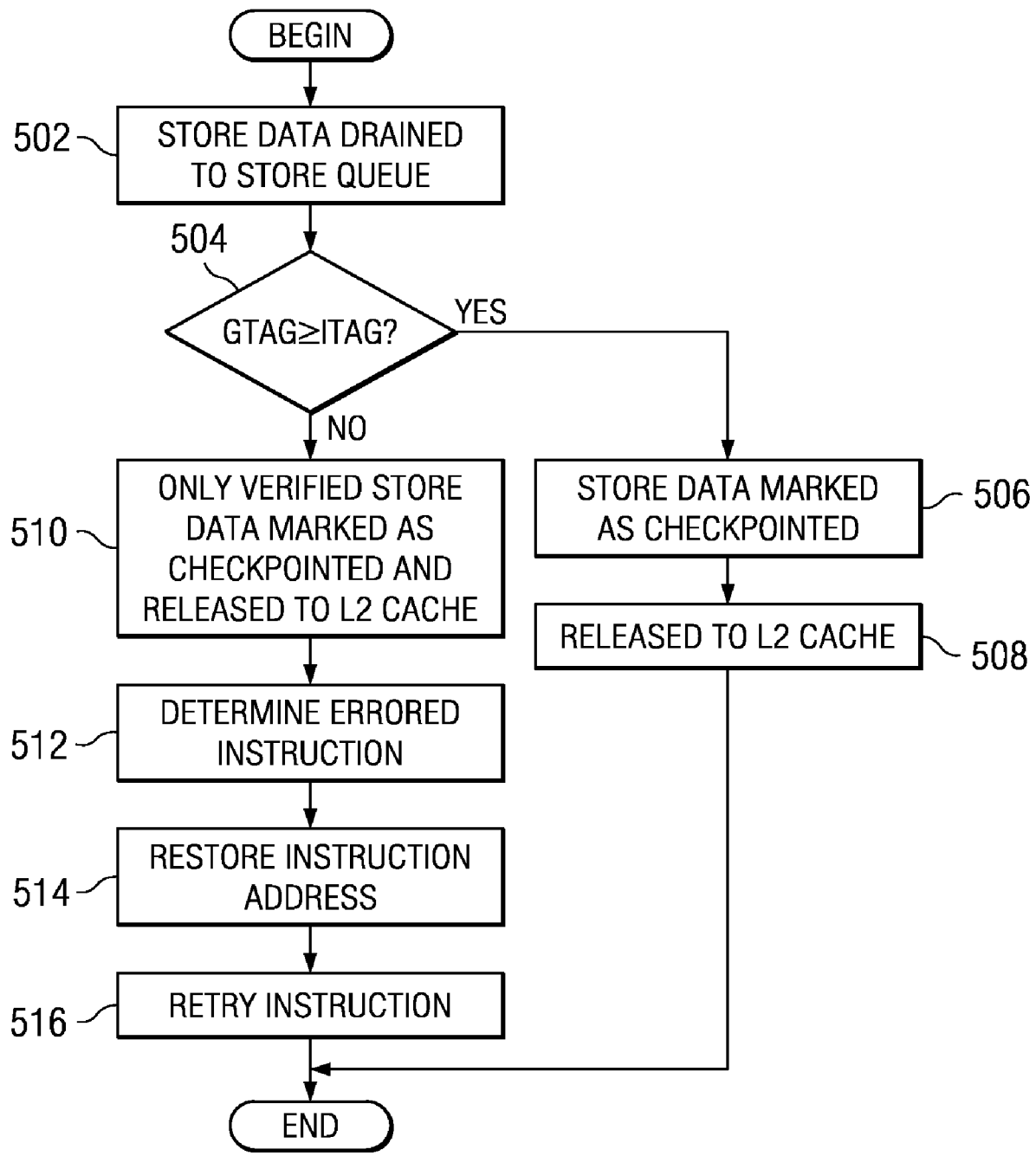
FIG. 5 illustrates a flowchart of an exemplary operation of checkpointing in accordance with a preferred embodiment of the present invention.

FIG. 5 is a flowchart illustrating an exemplary operation of checkpointing in accordance with a preferred embodiment of the present invention. Store data is written to the store queue in the LSU, with an accompanying Itag (block 502). The data remains in the store queue until the instruction group for the store is checkpointed. When the Runit drains an entry from the FXU/LSU write queue (FXWQ) and possibly the floating point write queue (FPWQ) or VMX stage queue, it forwards the associated Gtag (which was compared against the NTC Itag) to the store queue (block 502). The store queue compares the Gtag from the Runit against the Itags for the store data in the store queue (block 504). If the Gtag is greater than or equal to the Itag, then the store data is marked checkpointed in the store queue (block 506), and can be released to the system coherent L2 cache (block 508) and the operation ends. In the event of an error where the Gtag is not greater than or equal to the Itag (block 504), any store data which has already been marked checkpointed must be released to the L2 cache before taking further recovery action (block 510). Errors in the logic required to release the stores must be isolated from other errors so they can be escalated if not all stores were released to the L2 (block 512).

The completion logic manages a table of instruction addresses and Itags (Global Completion Table, GCT). In the event of an error, the checkpoint boundary is the Gtag for the oldest entry of the FXU/LSU write queue. The Runit passes this Gtag to the completion logic, and the completion logic looks up the instruction address (block 514) in the GCT so that the Runit then knows how to restore the instruction address to retry from after refreshing the processor from the checkpoint (block 516). Once instructions are checkpointed, the associated Itag entries in the GCT can be deallocated. Similarly to the store queue, the Runit sends the Gtag for each checkpointed instruction group to the completion logic, so the completion logic can deallocate the corresponding GCT entries with the operation ending thereafter.

Since the Runit controls the register checkpointing, releasing stores to L2, and releasing GCT entries, it provides a single point of control for blocking checkpointing when an error is detected, which is important for cycle-time and recoverability.

For non-retryable instructions which modify coherent state prior to completion (STCX, CI Load), we need to override the normal checkpoint blocking in the event of an error. The instruction grouping algorithm ensures that a STCX or CI load instruction will never be grouped with other instructions. The execution pipelines will not allow STCX or CI load to be sent outside the processor until it is the next instruction to complete. Once a STCX or CI Load is released outside the processor, an indication is sent to the Runit that the operation is in progress. If an error is reported to the Runit to block checkpointing while a STCX/CI load is in progress, the Runit waits for one more group to checkpoint before blocking it, which means waiting for the STCX/CI load to checkpoint.

Errors in the logic required to finish/complete a STCX or CI load must be isolated from all other errors so that they can be escalated during this window.

In summary, the present invention provides a method, and apparatus for dispatch group checkpointing in a microprocessor. By implementing an instruction checkpoint retry mechanism, recovery from soft errors in logic is performed. The present processor is able to dispatch fixed point unit (FXU), load/store unit (LSU), and floating point unit (FPU) or vector multimedia extension (VMX) instructions on the same cycle. Again, either FPU or VMX instructions are dispatched in the same group with fixed point instructions. FPU and VMX instructions are never dispatched in the same group. Store data is written to a store queue when a store instruction finishes executing. The data is held in the store queue until the store instruction is checkpointed, at which point it can be released to the coherently shared level 2 (L2) cache.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for dispatch group checkpointing in a data processing system, with capability to handle partially completed groups of instructions, in a microprocessor, the method comprising:
   selectively grouping, by an instruction dispatch unit, ones of a plurality of decoded instructions into a set of instructions according to which ones of a plurality of execution units are available to process the plurality of decoded instructions;
   assigning a group identifier to the set of instructions, wherein the set of instructions includes at least one fixed point instruction and a plurality of floating point instructions, and further wherein the plurality of floating point instructions execute out of order with respect to each other as well as out of order with respect to the at least one fixed point instruction, and wherein the group identifier is used to determine whether the set of instructions can be checkpointed;
   dispatching, by an instruction dispatch unit, the set of instructions;
   sending, upon the set of instructions being dispatched, the group identifier with the set of instructions;
   monitoring, by the microprocessor, the processing of the set of instructions;
   storing result data from the processing of the set of instructions;
   incrementing a counter responsive to an instruction from the set of instructions completing processing, wherein the counter is maintained by completion logic;
   responsive to determining that the set of instructions has completed processing, moving the result data to a store queue;
   determining if each one of the instructions in the set of instructions completed processing without error;
   in response to a first subset of the set of instructions being flushed and leaving only a second subset of the set of instructions that are still being processed, calculating a new group identifier, wherein the second subset includes some, but not all, of the set of instructions;
   assigning the new group identifier to the second subset of the set of instructions, wherein the new group identifier is used to determine whether the second subset can be checkpointed;
   determining if the second subset of the set of instructions includes at least one floating point unit (FPU) or a vector multimedia extension (VMX) instruction;
   in response to the second subset of the set of instructions including at least one floating point unit (FPU) or a vector multimedia extension (VMX) instruction, recalculating a number of floating point instructions that are included in the second subset of the set of instructions; and
   sending the new group identifier and the recalculated number of floating point instructions that are included in the second subset of the set of instructions to the recovery unit.

2. The method of claim 1, further comprising:
   in response to each one of the instructions in the set of instructions completing processing without error, marking the result data that was moved to the store queue as checkpointed; and
   releasing the result data that was moved to the store queue to a cache.

3. The method of claim 1, further comprising:
   in response to an error occurring during processing of at least one particular one of the instructions in the set of instructions, identifying instructions in the set of instructions that completed processing without error;
   marking the result data that was moved to the store queue as checkpointed; and
   releasing the result data that was moved to the store queue to a cache.

4. The method of claim 3, further comprising:
   identifying the at least one particular one of the instructions in the set of instructions;
   restoring an instruction address of the at least one particular one of the instructions in the set of instructions; and
   retrying the at least one particular one of the instructions in the set of instructions.

5. The method of claim 1, wherein the instructions in the set of instructions includes one of a load/store unit (LSU), a vector multimedia extension (VMX), a branch instruction, and a non-retryable instruction in addition to the at least one fixed point instruction and the plurality of floating point instructions.

6. The method of claim 5, further comprising;
   sending the group identifier and number of the plurality of floating point instructions to a recovery unit, wherein the determining that the set of instructions has completed processing is performed by comparing the group identifier to the counter.

7. The method of claim 1, wherein each instruction in the set of instructions is identified by an instruction identifier.

8. The method of claim 1, wherein the storing of result data includes storing the result data in one of a write queue, a reorder buffer and a stage queue.

9. The method of claim 1, further comprising:
   in response to an error occurring during processing of at least one particular one of the instructions in the set of instructions, waiting for one more of the instructions in the set of instructions to checkpoint, wherein the at least one particular one of the instructions in the set of instructions comprises at least one non-retryable instruction; and
   blocking a checkpoint.

* * * * *